US010252920B2

(12) United States Patent
Baldauf et al.

(10) Patent No.: US 10,252,920 B2
(45) Date of Patent: Apr. 9, 2019

(54) FLOWFIELD SENSORS FOR MONITORING LIQUID FLOW

(71) Applicant: International Business Machines Corporation, Armonk, NY (US)

(72) Inventors: Julia S. Baldauf, South Melbourne (AU); Darcy James Beurle, Melbourne (AU); Matthew Downton, Carlton (AU); Stephen M. Moore, Melbourne (AU); Christine Schieber, Southbank (AU); George Yiapanis, Northcote (AU)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 14/846,983

(22) Filed: Sep. 7, 2015

(65) Prior Publication Data

US 2017/0066660 A1 Mar. 9, 2017

(51) Int. Cl.
*B01D 21/30* (2006.01)
*C02F 1/24* (2006.01)
(Continued)

(52) U.S. Cl.
CPC ............. *C02F 1/008* (2013.01); *B01D 21/30* (2013.01); *B03D 1/028* (2013.01); *C02F 1/24* (2013.01);
(Continued)

(58) Field of Classification Search
CPC ........ C02F 1/008; C02F 1/24; C02F 2103/10; C02F 1/52; C02F 1/5209; C02F 1/5281;
(Continued)

(56) References Cited

U.S. PATENT DOCUMENTS 6,241,028 B1  6/2001  Bijleveld
6,471,853 B1 * 10/2002  Moscaritolo ......... B01D 35/143
                                                        210/143
(Continued)

FOREIGN PATENT DOCUMENTS

CA     2334106 A1    12/1999
CA     2334106 C     12/2006
(Continued)

OTHER PUBLICATIONS

Fjodors, Tjulkins et al, MEMS-Based Implantable Heart Monitoring System with Integrated Pacing Function, 2014 Electronic Components & Technology Conference, pp. 139-144 (IEEE 2014).
(Continued)

*Primary Examiner* — Joseph W Drodge
(74) *Attorney, Agent, or Firm* — Grant Johnson; Otterstedt, Ellenbogen & Kammer, LLP

(57) ABSTRACT

Data relating to fluid dynamics is obtained using a flow field sensor that measures acceleration and angular velocity of the sensor on three axes. Ballast control allows the sensor to obtain neutral buoyancy within the fluid. The sensor is effective in opaque fluids and closed containers as data is stored in a removable memory. Froth flotation systems are among the applications for the sensor. The small size, the geometry, and the center of mass of the sensor allow it to follow the flow field in a vessel without material disruption of the flow field or weight-induced angular displacement.

20 Claims, 3 Drawing Sheets

(51) Int. Cl.
*G01P 5/01* (2006.01)
*G01P 3/44* (2006.01)
*G01F 1/84* (2006.01)
*C02F 1/00* (2006.01)
*G01P 5/02* (2006.01)
*B03D 1/02* (2006.01)
*C02F 103/10* (2006.01)

(52) U.S. Cl.
CPC ............ *G01F 1/8409* (2013.01); *G01P 3/44* (2013.01); *G01P 5/01* (2013.01); *G01P 5/02* (2013.01); *C02F 2103/10* (2013.01); *C02F 2209/40* (2013.01); *C02F 2303/26* (2013.01)

(58) Field of Classification Search
CPC ............ C02F 2209/00; C02F 2209/005; C02F 2209/006; C02F 2209/008; C02F 2209/01; C02F 2209/10; C02F 2209/40; C02F 2209/42; G01P 5/00; G01P 3/00; G01P 3/44; G01P 3/64; G01P 15/00; G01P 15/001; G01P 15/0888; G01P 15/0891; G01P 15/14; G01P 15/16; G01P 15/18; G01P 2015/0862; G01P 2015/088; B01D 21/0084; B01D 21/30; B01D 21/32; B01D 21/34; G01N 11/00; G01N 11/10; B03D 1/02; B03D 1/028; B03D 1/1493; G01C 19/00; G01C 19/02; G01C 19/04; G01C 19/065; G01F 1/84; G01F 1/8404; G01F 1/8409; G01F 1/8431; G01F 1/8436; G01F 1/844; G01F 1/8445; G01F 1/845
USPC ........... 73/61.41, 61.42, 61.43, 61.44, 61.51, 73/61.61, 61.63, 61.64, 61.65, 61.66, 861, 73/861.351, 861.354, 861.356, 504.08, 73/504.09, 504.11, 504.17, 504.18, 510, 73/514.02, 866.5; 209/3.2, 162–164, 168; 210/85–87, 143, 703, 709, 739, 744; 702/45, 50, 55, 79, 116, 151
See application file for complete search history.

(56) References Cited

U.S. PATENT DOCUMENTS

| | | | |
|---|---|---|---|
| 6,558,216 B2 | 5/2003 | Yerazunis | |
| 6,999,816 B2 | 2/2006 | Van Bentem | |
| 7,278,293 B2 | 10/2007 | Sierra | |
| 8,573,062 B2 | 11/2013 | Zhao | |
| 8,823,007 B2 | 9/2014 | Yang | |
| 8,833,175 B2 | 9/2014 | Chandrasekharan | |
| 2005/0234220 A1* | 10/2005 | Koga | C08J 7/02 528/481 |
| 2005/0239220 A1* | 10/2005 | Dauwalter | G01C 19/24 438/3 |
| 2006/0293714 A1 | 12/2006 | Salo | |
| 2010/0006840 A1 | 1/2010 | Robert | |
| 2011/0197674 A1* | 8/2011 | Prandi | G01C 19/5726 73/504.12 |
| 2012/0279302 A1* | 11/2012 | Lim | G01C 19/5783 73/504.12 |
| 2012/0296601 A1* | 11/2012 | Eatwell | G01P 15/14 702/141 |
| 2014/0260607 A1 | 9/2014 | Baron | |
| 2014/0330530 A1* | 11/2014 | Pistre | G01V 9/02 702/50 |
| 2016/0016590 A1* | 1/2016 | Fernandez Pozo | B60W 40/10 702/141 |
| 2016/0359217 A1* | 12/2016 | Burdick | H01Q 1/1257 |
| 2017/0190598 A1* | 7/2017 | Liao | C02F 1/001 |

FOREIGN PATENT DOCUMENTS

| | | |
|---|---|---|
| CN | 202351436 | 7/2012 |
| CN | 202372173 | 8/2012 |
| CN | 202717577 | 2/2013 |
| EP | 2143684 | 1/2010 |
| JP | 5183467 | 12/2008 |
| KR | 101127862 B1 | 3/2012 |
| KR | 101152523 | 5/2012 |
| KR | 101469070 B1 | 12/2014 |
| WO | WO2014144070 A1 | 9/2014 |

OTHER PUBLICATIONS

Tjulkins, Fjodors et al, 3-axis MEMS Accelerometer-based Implantable Heart Monitoring System with Novel Fixation Method, 2013 Electronic Components & Technology Conference, pp. 510-516 (IEEE 2013).
Vectornav Technologies, VN-100 Surface Mount IMU/AHRS, Sep. 3, 2015, pp. 1-2, downloaded from http://www.vectornav.com/products/vn100-smd.

* cited by examiner

FLOWFIELD SENSORS FOR MONITORING LIQUID FLOW

FIELD

The present disclosure relates to sensors for monitoring liquid flow, particularly in froth flotation systems.

BACKGROUND

Froth flotation is a process used to selectively separate hydrophobic from hydrophilic materials. While applicable in a number of industries, one area of great importance is the mining industry where it is commonly used for the recovery of metal sulfide ores or coal, for example. The key steps in the process involve initially grinding the ore (a process known as 'comminution') to a relatively fine particle size in order to 'liberate' the valuable mineral from the remaining commercially worthless material (known as 'gangue'). Following this step, the ground ore is mixed with water to form a 'slurry' and a surfactant (or 'collector') is commonly added to bind to the surface of the desired mineral to render it hydrophobic. The slurry is introduced into an aerated flotation cell (often mechanically agitated with an impeller) such that the hydrophobic particles collide and bind with the air bubbles and rise to the surface of the cell, forming a froth of purified mineral which is then collected.

Industrial processes such as fluid mixing and solid particulate transport, as discussed above with respect to froth flotation, involve a multi-phase flow that is often pumped through complex geometry or mixed using an impeller. Due to the large scale of some mixing and transport processes, the flow will be turbulent and traveling at a high velocity. Improvements to such processes can potentially yield significant savings in energy and/or other costs. An understanding of the fluid dynamics may facilitate the ability to aid design and optimization of fluid mixing/transport processes.

Techniques for gaining insight into the details of a fluid flow come from the fields of Computational Fluid Dynamics (CFD) and Experimental Fluid Dynamics (EFD). Due to limitations associated with predicting complicated flow regimes, an EFD approach is often taken. Available EFD technologies include Laser Doppler Anemometry (LDA), Particle Image Velocimetry (PIV), Hot Film Anemometry (HFA), Ultrasound Velocity Profiler (UVP) and piezoelectric force sensors. The majority of these techniques rely on the working fluid being transparent such that light is able to penetrate the fluid. Some industrial processes, however, involve opaque liquid-solid mixtures such as slurries and/or opaque containers. Techniques that require transparency are impractical under such conditions.

SUMMARY

Principles of the present disclosure provide an exemplary method that includes obtaining a vessel and causing a fluid comprising a liquid to flow within the vessel. A sensing device is introduced to the vessel. The sensing device includes a casing defining an interior space and having a maximum diameter of forty millimeters or less. The casing further includes a first portion separable from a second portion to provide access to the interior space. A three-axis gyroscope is positioned within the casing for measuring time rate of change of angular displacement of the sensing device. An accelerometer within the casing measures acceleration of the sensing device. An electronic memory and a mainboard are within the casing, the mainboard interfacing between the electronic memory and the three-axis gyroscope and the accelerometer. A power supply within the casing is configured for powering the three-axis gyroscope, the accelerometer, the electronic memory, and the mainboard. The buoyancy of the sensing device is neutral with respect to the fluid. An initial position for the sensing device is established. Data relating to the time rate of change of angular displacement of the sensing device and acceleration of the sensing device within the fluid is obtained. The data is stored in the memory. The sensing device is retrieved and the first portion of the casing of the sensing device is separated from the second portion thereof to gain access to the interior space. The electronic memory is downloaded to obtain the stored data.

An exemplary sensor device includes a casing defining an interior space and having a maximum diameter of forty millimeters or less. The casing further includes a first portion separable from a second portion to provide access to the interior space. A three-axis gyroscope is within the casing for measuring time rate of change of angular displacement of the sensing device. An accelerometer is also within the casing for measuring acceleration of the sensing device. A mainboard interfaces between an electronic memory within the casing and the three-axis gyroscope and the accelerometer. A power supply within the casing is configured for powering the three-axis gyroscope, the accelerometer, the electronic memory, and the mainboard.

A froth flotation system provided in accordance with a further embodiment includes a froth flotation cell, a slurry within the froth flotation cell, and a sensing device positioned within the slurry for following a flow field within the froth flotation cell. The sensing device includes a casing defining an interior space and a first casing portion separable from a second casing portion to provide access to the interior space. A three-axis gyroscope is provided for measuring time rate of change of angular displacement of the sensing device and an accelerometer is provided for measuring acceleration of the sensing device. A mainboard interfaces between an electronic memory and the three-axis gyroscope and the accelerometer. The electronic memory, gyroscope and accelerometer are all within the casing. A power supply within the casing is configured for powering the three-axis gyroscope, the accelerometer, the electronic memory, and the mainboard. The buoyancy of the sensing device is neutral with respect to the slurry. The sensing device further has a center of mass located substantially at its geometric center.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

The sensing devices and methods as disclosed herein can provide substantial beneficial technical effects. For example, one or more embodiments may provide one or more of the following advantages:

Obtaining insight into details relating to flow fields regardless of light penetration within a liquid flow;
Facilitating operation and/or design of aqueous transport systems;
Validation of computational models of flotation cells.

These and other features and advantages will become apparent from the following detailed description of illustrative embodiments thereof, which is to be read in connection with the accompanying drawings.

DETAILED DESCRIPTION

Exemplary embodiments of the present disclosure provide methods for obtaining data relating to the fluid dynamics within a system such as a froth flotation system. A sensing device is provided for obtaining such data. The methods disclosed are not subject to the ability of light to penetrate the fluid and/or the fluid container from which flow data is to be obtained, and can be employed in opaque fluids or slurries and within opaque containers.

A sensing device is disclosed that contains a MEMS (micro-electromechanical system) accelerometer and gyroscope that can be placed into a flow and record its acceleration as it moves within the flow field. Upon recovery of the sensing device, the acceleration data can be retrieved in some embodiments via a removable onboard memory and post-processed with custom software to produce a trajectory through space and time. Such results may be analogous to streak-lines or particle traces that are often used as a post-processing tool with CFD and EFD results. The properties of the working fluid are not as restrictive using the disclosed sensing devices and methods as compared to previously attempted processes. The disclosed sensing devices are small enough to substantially follow the flow field in a mixing vessel without significant disruption. In addition, they can be recovered upon completion of testing from large industrial mixing vessels to allow data recovery and/or reuse for further testing.

The flow field sensing devices employed in one or more embodiments include spherical containers having diameters forty millimeters (40 mm) of less that move within a froth flotation cell or similar type of large scale mixing vessel with a highly turbulent and possible opaque liquid or slurry in order to record a trajectory and allow for post-processing to determine streak-lines defining the flow field. Maximum container diameters are preferably twenty millimeters (20 mm) or less in some applications, such as within froth flotation cells. Linear and angular acceleration are recorded as a function of time within a turbulent flow field. Such data are used to perform numerical integration in a post-processing step in order to compute velocities and positions (i.e. trajectories) through space and time that are representative of the fluid flow field. The operating parameters and/or the components of the system can be modified once such trajectories are determined to modify the flow field as may be necessary. The sensor(s) employed in obtaining data are small relative to the vessels in which they are employed so that they move with the flow field without materially affecting the flow field. In one or more embodiments, the sensor(s) is at least two orders of magnitude smaller in diameter than the diameter of the tank or other vessel in which it is placed.

Figure 1:
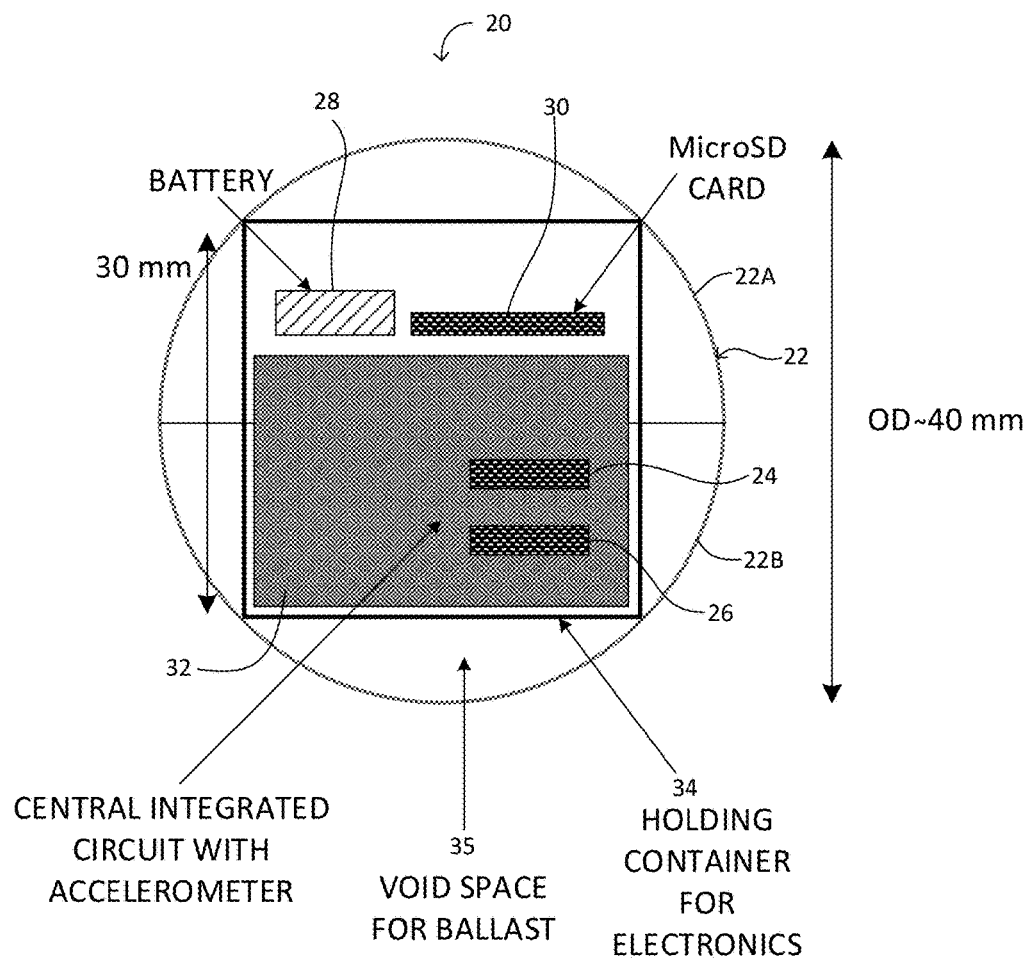
FIG. 1 is a schematic illustration showing an exemplary sensing device.

Referring to FIG. 1, a sensing device 20 includes a spherical casing 22 including first and second hemispherical halves 22A, 22B. A high density polyethylene (HDPE) casing is employed in one or more embodiments to prevent impact damage and provide resistance to possible chemical attack. The two halves 22A, 22B are detachable to provide access to the contents of the casing 22. In some embodiments, the halves are coupled by threads (not shown). A bayonet locking mechanism is employed in other embodiments An O-ring (not shown) is provided between halves to further protect against fluid ingress in some embodiments. Spherical casings 22 are preferred over other non-spherical configurations. Non-spherical casings would likely align themselves to the streamlines of the flow in the direction of least drag, thereby increasing the force required to change direction.

The sensing device 20 in the exemplary embodiment shown in FIG. 1 includes six (6) main components within the casing 22. One of these components is a MEMS accelerometer 24. An exemplary accelerometer is distributed by Analog Devices, Inc. under product number ADXL345BCCZ. This accelerometer is a small, thin, low power, three-axis accelerometer with high resolution (13-bit) measurement at up to ±16 g. Digital output data is formatted as 16-bit twos complement and is accessible through either a SPI (3- or 4-wire) or I2C digital interface. It measures the static acceleration of gravity in tilt-sensing applications, as well as dynamic acceleration resulting from motion or shock. The unit weighs approximately 30 mg and operates from −40 to 85° C. Its dimensions are approximately 3×5×1 mm. This particular accelerometer is exemplary, and other accelerometers having similar capabilities and capable of fitting within the casing 22 could alternatively be employed.

A MEMS gyroscope 26 is also positioned within the casing 22. The STMicroelectronics A3G4250D gyroscope is a commercially available, low power consumption, three-axis MEMS gyroscope that may be employed. This component measures the time rate of change of angular displacement. The package size of the gyroscope is 4×4×1.1 mm. This particular MEMS gyroscope is exemplary, and other gyroscopes having similar capabilities and capable of fitting within the casing 22 could alternatively be employed.

A power source 28 is provided for powering the sensors 24, 26 and other components of the sensing device 20. A watch battery capable of supplying two to three volts is employed in some embodiments. A secure digital (SD) card such as a microSD card 30 allows the electronic storage of data obtained from the sensors. The card 30 is removable from the casing 22. A mainboard 32 provides an interface between the electronic memory (e.g. microSD card 30) and the MEMS sensors 24, 26. The mainboard can be an off-the-shelf component or a custom component. A container or support 34 is provided within the casing 22 to which the electronic components are affixed. Other than the microSD card 30, the electronic components can be permanently affixed to the support 34. The power supply is also preferably removable. The support 34 is removable from the casing 22 in some embodiments, though movement of the electronic components with respect to the casing is prevented during use of the sensing device 20.

Ballast control is obtained by providing one or more void spaces 35 to which ballast can be added (or removed) when the casing halves 22A, 22B are separated. In one or more embodiments, the weight of the sensing device 20 is adjusted to provide neutral buoyancy within the liquid or slurry to be monitored. Ballast control allows the sensor(s) to achieve neutral buoyancy in bubbly, particle-containing aqueous mixtures at desired height(s) throughout the test vessel. The center of mass of the sensing device 20 is preferably substantially at the geometric center of the device. Such a center of mass helps avoid weight-induced angular displacement as the device moves within a flow field. In some embodiments where the internal elements of the sensing device, such as the power supply and sensors, cause the center of mass to be displaced from the geometric center, the ballast is located to adjust the center of mass as well as to provide the desired buoyancy of the sensing device. Multiple sensing devices, some having the same density and others having different densities can be introduced sequentially or simultaneously. While a slurry within a flotation cell is expected to have homogeneous density, such density could vary with upstream processing conditions and temperature. In some embodiments, a collar is provided on the casing 22 of the sensing device 20. The collar includes holes positioned at non-uniform intervals with corresponding holes extending through the casing 22. The collar is movable with respect to the casing to allow liquid to fill one or more of the void spaces 34, thereby changing the effective density of the sensing device. The electrical components within the casing should be encased in a liquid-tight enclosure if such a collar is employed The buoyancy of the sensing device, as determined by the device components and possibly added ballast, causes the sensing device to be positioned in a chosen depth within the liquid or slurry that is being monitored. In alternative embodiments, the casing 22 and/or one or more internal components have chosen weights so that the sensing device has a neutral buoyancy in a particular medium. Loose, removable ballast is added to or removed from one or more of the void spaces 34 to affect buoyancy in some embodiments. Sensing devices can be coded by weight in some embodiments. In some embodiments, sensing devices having different buoyancies are introduced into the liquid or slurry to be monitored and travel with the flow field at different depths. Such an approach ensures that one or more sensing devices will likely be moving within a portion of the fluid stream from which meaningful data can be obtained.

The accelerometer 24 and gyroscope 26 are used in conjunction to describe the position of the sensing device 20 as it moves around in the flow field. These elements electrically communicate with the mainboard, which formats the data to a readable format. Using a Newton-Euler dynamics approach, it is possible to obtain the forces, moments and the sensor position with respect to a defined starting position within a flow field. These values are obtained from the data output of the gyroscope and accelerometer, The angular velocity of the sensing device 20 can be computed by numerically integrating from the data output from the gyroscope (angular velocity). These angles can then be used to compute the rotation of the sensor with respect to the inertial coordinate frame (laboratory frame) using Euler angles (rotational matrix) approach or by converting to quaternions to describe the rotations. The particle traces of the sensor 20 can be computed from the integration of the acceleration as the spherical device 20 is carried by the flow field.

Figure 2:
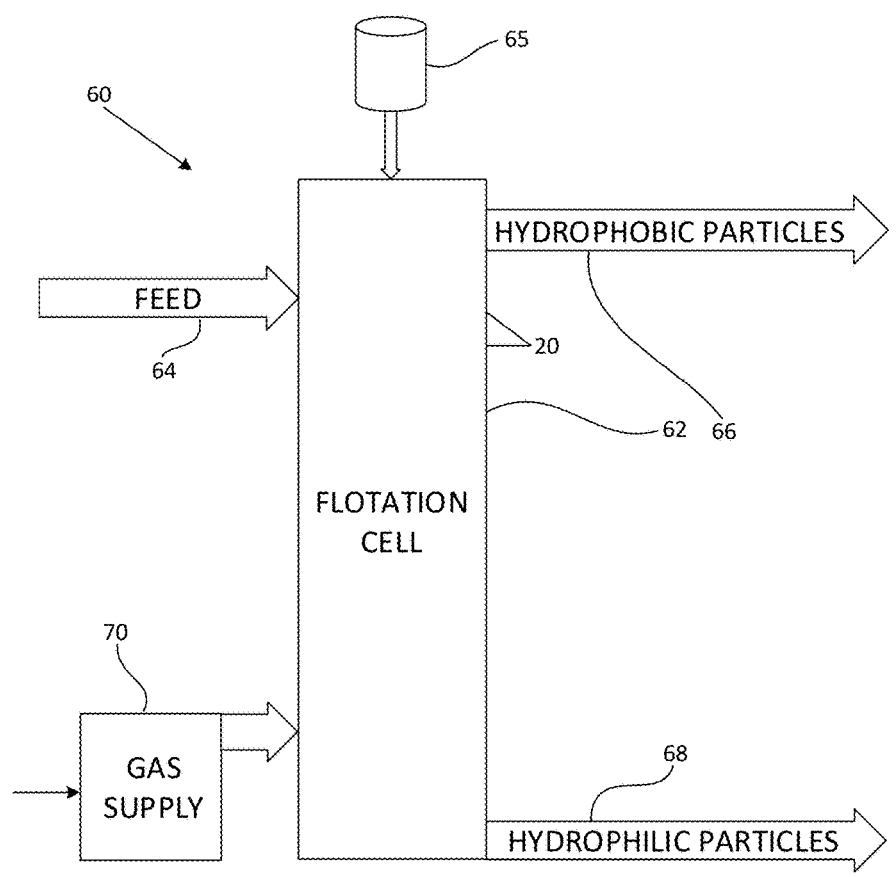
FIG. 2 is a diagram of an exemplary froth flotation system.

FIG. 2 shows an exemplary froth flotation system 60 in which sensing devices as described above can be employed. The system includes a flotation cell 62 operatively associated with a feed 64, an outlet 66 for discharging particles floated using techniques as disclosed herein, and an outlet 68 for untargeted particles. A gas supply 70 includes means for introducing gas into the slurry and can be partially or entirely within the flotation cell itself. Large bubbles can be formed via conventional means in the froth floatation cell. This includes 1) the electrolysis of diluted aqueous, conducting solutions with the production of gas bubbles at both electrodes; 2) mechanical formation by a combination of a high-speed mechanical agitator and an air injection system; and 3) reduction in pressure of water pre-saturated with air at pressures higher than atmospheric. Nanobubbles, if desired, could be generated by cavitation, possibly by fluid flow, which is referred to as hydrodynamic cavitation, and is produced by pressure variation in a flowing liquid caused by the velocity variation in the system. The other is by an acoustic field, which is often referred to as acoustic cavitation. Cavitation also can be achieved in nature by local energy deposit: either by photons of laser light or by other elementary particles (e.g., protons in a bubble chamber), which are often referred to as optical cavitation and particle cavitation respectively. Two sensing devices 20 are shown within the flotation cell. The elements shown are not to scale. As discussed above, the sensing devices 20 are at least two orders of magnitude smaller in diameter than the tanks in which they are introduced to capture flow field data in one or more embodiments. For example, the flotation cell 62 has a diameter of several meters in some embodiments while the sensing devices are five centimeters or less in diameter. In the exemplary embodiment, the sensing devices have different buoyancies and are at different depths within the slurry contained within the flotation cell 62. The density of the sensing devices is targeted such that they move within a flow field that allows them to obtain useful data.

Figure 3:
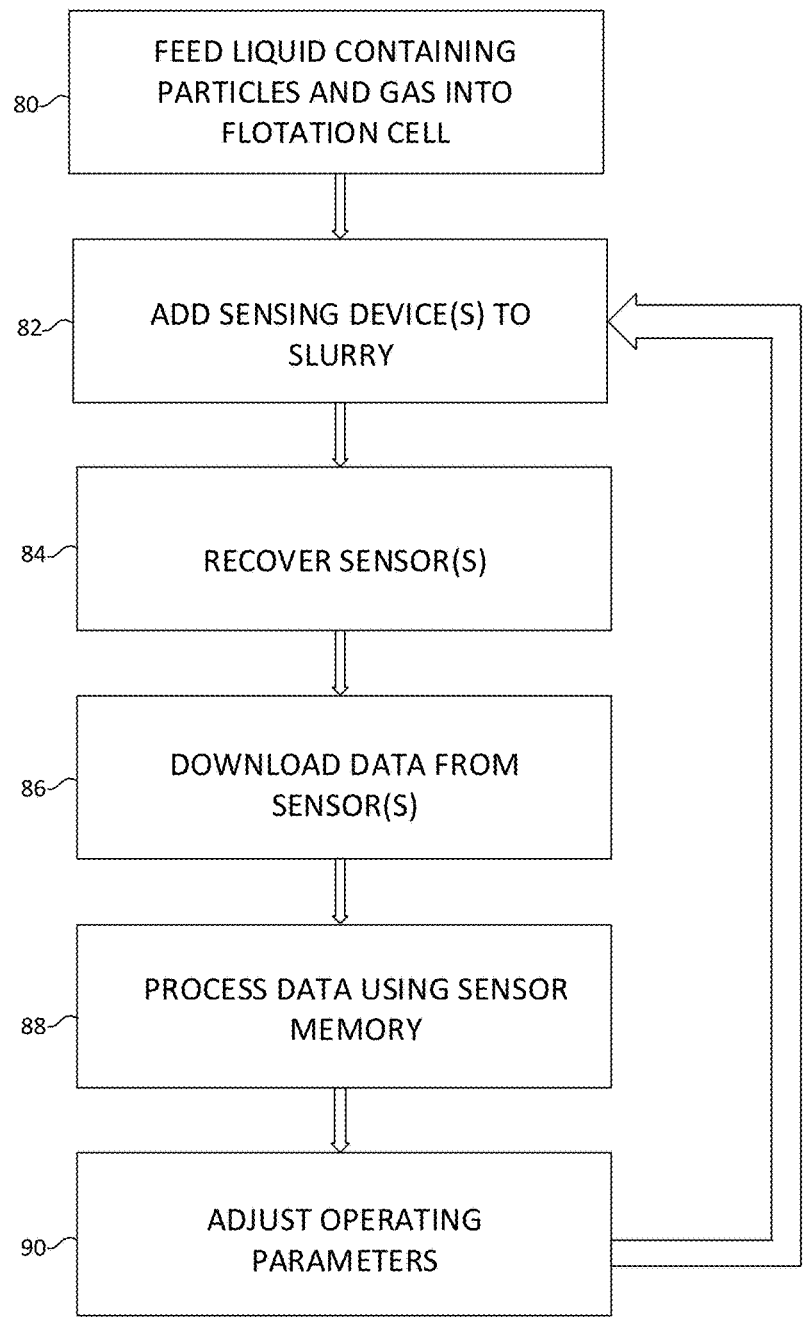
FIG. 3 is a flow chart showing an exemplary process for monitoring and controlling a froth flotation system.

FIG. 3 is a flow diagram illustrating use of sensors as described above in a froth flotation system. In a first step 80, liquid containing particles to be separated is introduced to a flotation cell 62. Gas is also introduced to the slurry in order to form bubbles therein and create froth. One or more sensors 20 are introduced into the flotation cell 62 in step 82. This step is simultaneous with the first step in some embodiments and subsequent thereto in other embodiments. The sensors, if more than one is employed, have the same diameter and weight in some embodiments. In other embodiments, the sensors have different diameters and/or weights and/or densities. In some embodiments, multiple sensors having different buoyancies are introduced. In some embodiments, the sensor(s) are placed into the flow before flow disturbance in order to establish an initial position for each sensor. In other embodiments, the sensor(s) are dropped into the mixing vessel such as the flotation cell 62. In such other embodiments, the sensing device(s) are stored in a hopper 65 to provide a reference starting position. The hopper has a discharge opening that allows the sensing devices to be dropped into the flotation cell. Recording of data begins when impact with the free surface of the slurry within the cell is detected. The sensing device(s) 20 is intended to move along with the liquid and accordingly is small and neutrally buoyant. Neutral buoyancy is understood as having an average density that is equal to the density of the fluid in which it is immersed. The sensing device(s) having neutral buoyancy will ideally have an equal tendency to float or sink in the slurry. As the density of a slurry may or may not be consistent, sensing devices having different densities are introduced in some embodiments so that at least some will obtain data representing a streamline of the fluid flow. Forces other than fluid drag, such as gravity, preferably do not affect motion of the sensing devices. In addition, the sensing device(s) do not materially affect the fluid flow. The sensing device(s) are recovered in step 84 after sufficient time has elapsed to obtain the required data relating to the fluid dynamics of the system. In some embodiments, the sensing device(s) are recovered after the flotation cell has been turned off. In other embodiments, the sensing device(s) are recovered from the froth at the top of the flotation cell while the slurry pump continues to operate. Recovery from the froth is possible in some embodiments as the sensors, despite having neutral buoyancy with respect to the slurry, may be carried upwardly by the bubbles along with other solid particles within the slurry and are within the froth. Sensing devices that are not recovered from the froth may be recovered later when the impeller and other elements of the system have been turned off. As discussed above, data is obtained and stored during the time the sensing device(s) are in the flotation cell. The operating parameters may or may not remain constant during the time the sensing device(s) are within the slurry obtaining data. For example, the speed of the slurry pump (impeller) may change so that the sensing device(s) can detect the effects of the change. Raw data from the sensors 24, 26 within the sensing devices is processed by the mainboard in some embodiments and stored in the memory. Upon recovery, the sensing device casing(s) is opened and stored information is downloaded from the memory in step 86. In some embodiments, the memory is removable from the casing to facilitate downloading the information contained therein. Such information may include integrated data relating to trajectories, stream lines, and changes to stream lines. The downloaded data is processed in step 88 to the extent that may be required. As discussed above, post-processing software can be used to perform numerical analysis of data imported from the memory and produce data in a suitable format to compare with computational results such as CFD simulations. Time integration to obtain a trajectory is performed in some embodiments, assuming that the sensing device has obtained a data set that defines a number of positions with x, y and z coordinates at different moments in time, and also velocity vectors with x, y and z components at different moments in time. In some embodiments, it can be determined whether the fluid flow characteristics are consistent with high particle recovery by the froth flotation system. For example, slurry pump impeller speed and turbulence are directly related, and particle recovery is dependent in part on turbulent kinetic energy. One or more parameters such as feed rate, flotation cell geometry, and impeller size and speed, can be adjusted in step 90. Some adjustments can be made without discontinuing the froth flotation process and prior to sensor recovery in step 84. In some embodiments, no changes in operating parameters are made. The sensing device(s) 20 can be reintroduced to the slurry and/or new sensor(s) introduced to the slurry to obtain further data for additional refining of the froth flotation process. Impeller speed or size and/or other parameters are adjusted in some embodiments prior to running additional tests.

Given the discussion thus far and with reference to the exemplary embodiments discussed above and the drawings, it will be appreciated that, in general terms, an exemplary method includes obtaining a vessel and causing a fluid comprising a liquid to flow within the vessel. A sensing device is introduced to the vessel. The sensing device includes a casing 22 defining an interior space and having a maximum diameter of forty millimeters or less. The casing further including a first portion 22A separable from a second portion 22B to provide access to the interior space. A three-axis gyroscope 26 is within the casing for measuring time rate of change of angular displacement of the sensing device 20. An accelerometer 24 within the casing is provided for measuring acceleration of the sensing device 20. The sensing device further includes an electronic memory 30, a mainboard 32 interfacing between the electronic memory and the three-axis gyroscope and the accelerometer, a power supply 28 configured for powering the three-axis gyroscope, the accelerometer, the electronic memory, and the mainboard. The buoyancy of the sensing device is neutral with respect to the fluid. An initial position is established for the sensing device. Data relating to the time rate of change of angular displacement of the sensing device and acceleration of the sensing device within the fluid is obtained. The data obtained by the sensing device within the fluid is stored in the memory. The sensing device 20 is retrieved from the fluid and the first portion 22A of the casing is separated from the second portion 22B thereof to gain access to the interior space. The electronic memory is downloaded to obtain the stored data. The electronic memory is removable in some embodiments to facilitate later processing. A froth flotation cell is employed in some embodiments of the method and the fluid includes a slurry. Bubbles are formed within the slurry and froth within the froth flotation cell. In some embodiments, the step of retrieving the sensing device 20 further includes recovering the froth. Ballast is added to the sensing device or removed to obtain neutral buoyancy within the slurry if necessary.

An exemplary sensing device includes a casing 22 defining an interior space and having a maximum diameter of forty millimeters or less, the casing further including a first portion 22A separable from a second portion 22B to provide access to the interior space. A three-axis gyroscope, an accelerometer, and an electronic memory are within the casing. A mainboard interfaces between the electronic memory and the three-axis gyroscope and the accelerometer. A power supply within the casing is configured for powering the three-axis gyroscope, the accelerometer, the electronic memory, and the mainboard. The sensing device the casing is spherical in some embodiments. The sensor device includes removable ballast within the interior space in some embodiments.

An exemplary system includes a froth flotation cell 62, a slurry within the froth flotation cell, and a sensing device within the slurry. The sensing device includes a casing 22 defining an interior space and having a maximum diameter of forty millimeters or less, a first portion 22A separable from a second portion 22B to provide access to the interior space. A three-axis gyroscope, an accelerometer, and an electronic memory are positioned within the casing. A mainboard interfaces between the electronic memory and the three-axis gyroscope and the accelerometer. A power supply in the casing is configured for powering the three-axis gyroscope, the accelerometer, the electronic memory, and the mainboard. The buoyancy of the device is neutral with respect to the slurry. In some embodiments, removable ballast is positioned within the interior space of the casing to achieve neutral buoyancy. The casing is spherical in one or more embodiments. The electronic memory may include a removable card containing data from the accelerometer and gyroscope that may be downloaded and processed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation. It should also be noted that, in some alternative implementations, the steps of the exemplary methods may occur out of the order noted in the figures. For example, two steps shown in succession may, in fact, be executed substantially concurrently, or certain steps may sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

What is claimed is:

1. A method comprising:
    obtaining a vessel;
    causing a fluid comprising a liquid to flow within the vessel;
    introducing a first sensing device to the vessel, the first sensing device comprising:
        a casing defining an interior space and having a maximum diameter of forty millimeters or less, the casing further including a first portion separable from a second portion to provide access to the interior space;
        a three-axis gyroscope within the casing for measuring time rate of change of angular displacement of the sensing device;
        an accelerometer within the casing for measuring acceleration of the sensing device;
        an electronic memory within the casing;
        a mainboard electrically communicating with the three-axis gyroscope and the accelerometer, the mainboard further providing an electrical interface between the electronic memory and the three-axis gyroscope and the accelerometer;
        a power supply within the casing and configured for powering the three-axis gyroscope, the accelerometer, the electronic memory, and the mainboard, and
        a targeted average density;
    establishing an initial position for the first sensing device;
    obtaining data relating to the time rate of change of angular displacement of the first sensing device and acceleration of the first sensing device within the fluid;
    storing the data relating to the time rate of change of angular displacement of the first sensing device and acceleration of the first sensing device within the fluid in the electronic memory;
    retrieving the first sensing device;
    separating the first portion of the casing of the first sensing device from the second portion thereof to gain access to the interior space, and
    downloading the electronic memory to obtain the stored data.

2. The method of claim 1, further including the step of removing the electronic memory from the casing prior to downloading.

3. The method of claim 2, further including:
    introducing a second sensing device to the fluid, the second sensing device including:
        a casing defining an interior space and having a maximum diameter of forty millimeters or less, the casing further including a first portion separable from a second portion to provide access to the interior space;
        a three-axis gyroscope within the casing for measuring time rate of change of angular displacement of the sensing device;
        an accelerometer within the casing for measuring acceleration of the sensing device;
        an electronic memory within the casing;
        a mainboard electrically communicating with the three-axis gyroscope and the accelerometer, the mainboard further providing an electrical interface between the electronic memory and the three-axis gyroscope and the accelerometer;
        a power supply within the casing and configured for powering the three-axis gyroscope, the accelerometer, the electronic memory, and the mainboard, and
        an average density different from the targeted average density of the first sensing device.

4. The method of claim 1, wherein the vessel includes a froth flotation cell and the fluid comprises a slurry including the liquid and solid particles suspended within the liquid.

5. The method of claim 4, wherein the slurry within the froth flotation cell has a homogeneous density, the targeted average density of the first sensing device being equal to the density of the slurry.

6. The method of claim 4, wherein retrieving the first sensing device further includes recovering the froth.

7. The method of claim 4, wherein establishing the initial position for the first sensing device includes positioning the first sensing device within a hopper, further including releasing the first sensing device from the hopper into the froth flotation cell such that the first sensing device impacts with the slurry.

8. The method of claim 7, wherein obtaining the data further includes recording the data starting with the time of impact of the first sensing device with the slurry.

9. The method of claim 7, further including the step of removing the electronic memory from the casing prior to downloading.

10. The method of claim 7, further including:
    introducing a second sensing device to the fluid, the second sensing device including:
        a casing defining an interior space and having a maximum diameter of forty millimeters or less, the casing further including a first portion separable from a second portion to provide access to the interior space;
        a three-axis gyroscope within the casing for measuring time rate of change of angular displacement of the sensing device;
        an accelerometer within the casing for measuring acceleration of the sensing device;
        an electronic memory within the casing;
        a mainboard electrically communicating with the three-axis gyroscope and the accelerometer, the mainboard electrically interfacing between the electronic memory and the three-axis gyroscope and the accelerometer;

a power supply within the casing and configured for powering the three-axis gyroscope, the accelerometer, the electronic memory, and the mainboard, and an average density different from the targeted average density of the first sensing device.

11. The method of claim 1, wherein the casing of the first sensing device is spherical.

12. The method of claim 11, further including opening the casing and adding ballast to the interior space within the casing.

13. The method of claim 1, further wherein the casing of the first sensing device is spherical and the first sensing device has a center of mass located substantially at the geometric center of the first sensing device.

14. A sensing device comprising:
a spherical casing defining an interior space and having a maximum diameter of forty millimeters or less, the casing further including a first portion separable from a second portion to provide access to the interior space;
a three-axis gyroscope within the casing for measuring time rate of change of angular displacement of the sensing device;
an accelerometer within the casing for measuring acceleration of the sensing device;
an electronic memory within the casing;
a mainboard electrically communicating with the three-axis gyroscope and the accelerometer and providing an electrical interface between the electronic memory and the three-axis gyroscope and the accelerometer;
a power supply within the casing configured for powering the three-axis gyroscope, the accelerometer, the electronic memory, and the mainboard, and
further including a center of mass located substantially at the geometric center of the sensing device.

15. The sensing device of claim 14, wherein the spherical casing has a diameter of forty millimeters or less.

16. The sensing device of claim 15, further including removable ballast located within the interior space of the spherical casing.

17. A froth flotation system comprising:
a froth flotation cell;
a slurry within the froth flotation cell, and
a sensing device positioned within the slurry for following a flow field within the froth flotation cell, the sensing device comprising:
a spherical casing defining an interior space and including a first portion separable from a second portion to provide access to the interior space;
a three-axis gyroscope within the casing for measuring time rate of change of angular displacement of the sensing device;
an accelerometer within the casing for measuring acceleration of the sensing device;
an electronic memory within the casing;
a mainboard electrically communicating with the three-axis gyroscope and the accelerometer and providing an electrical interface between the electronic memory and the three-axis gyroscope and the accelerometer;
a power supply within the casing and configured for powering the three-axis gyroscope, the accelerometer, the electronic memory, and the mainboard, and
the sensing device further including a center of mass located substantially at its geometric center.

18. The system of claim 17, further including removable ballast located within the interior space of the casing.

19. The system of claim 17, wherein the slurry within the froth flotation cell has a homogeneous density, the first sensing device having an average density equal to the density of the slurry.

20. The system of claim 19, wherein the electronic memory includes a removable memory card.

* * * * *